United States Patent [19]
Miyoshi et al.

[11] Patent Number: 6,004,521
[45] Date of Patent: *Dec. 21, 1999

[54] CATALYST FOR PURIFYING EXHAUST GASES

[75] Inventors: Naoto Miyoshi, Nagoya; Tuneyuki Tanizawa, Toyota; Koichi Kasahara; Syuji Tateishi, both of Ogasa-gun, all of Japan

[73] Assignees: Toyota Jidosha Kabushiki Kaisha, Aichi-ken; Cataler Industrial Co., Ltd., Shizuoka-ken, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/638,045

[22] Filed: Apr. 26, 1996

Related U.S. Application Data

[63] Continuation of application No. 08/390,785, Feb. 17, 1995, abandoned.

[30] Foreign Application Priority Data

Feb. 23, 1994 [JP] Japan ..................... 6-025326

[51] Int. Cl.⁶ ............. B01D 53/94; B01J 23/58; B01J 23/63
[52] U.S. Cl. ............ 423/213.5; 502/302; 502/303; 502/328; 502/330
[58] Field of Search ............ 423/213.5, 239.1; 502/304, 328, 330, 302, 303

[56] References Cited

U.S. PATENT DOCUMENTS

| | | | |
|---|---|---|---|
| 4,001,143 | 1/1977 | McCann, III | 423/213.5 |
| 4,369,132 | 1/1983 | Kinoshita et al. | 423/213.5 |
| 4,621,071 | 11/1986 | Blanchard et al. | 502/328 |
| 4,675,308 | 6/1987 | Wan et al. | 502/304 |
| 4,678,770 | 7/1987 | Wan et al. | 502/304 |
| 4,975,406 | 12/1990 | Frestad et al. | 502/302 |

FOREIGN PATENT DOCUMENTS

| | | |
|---|---|---|
| 0170841 | 7/1984 | European Pat. Off. . |
| 0171151 | 2/1986 | European Pat. Off. . |
| 0462593 | 12/1991 | European Pat. Off. . |
| 0573672 | 7/1993 | European Pat. Off. ........ 423/239.1 |
| 0562516 | 9/1993 | European Pat. Off. . |
| 0613714 | 9/1994 | European Pat. Off. . |
| 5-317652 | 12/1993 | Japan . |

OTHER PUBLICATIONS

Ullmann's Encyclopedia of Industrial Chemistry, vol. A:5, pp. 347–351, (1986).

*Primary Examiner*—Wayne Langel
*Assistant Examiner*—Peter DiMauro
*Attorney, Agent, or Firm*—Oliff & Berridge, PLC

[57] ABSTRACT

A catalyst for purifying exhaust gases includes a heat resistant support, a porous layer coated on the heat resistant support, a noble metal catalyst ingredient loaded on the porous layer, and an $NO_x$ storage component including at least one member selected from the group consisting of alkaline-earth metals, rare-earth elements and alkali metals, and loaded on the porous layer. In the catalyst, the noble metal catalyst ingredient and the $NO_x$ storage component are disposed adjacent to each other, and are dispersed uniformly in the porous layer. In fuel-lean (i.e., oxygen-rich) atmospheres, NO present in exhaust gases is oxidized to $NO_2$ by the noble metal catalyst ingredient, and at the same time the resulting $NO_2$ is stored in the $NO_x$ storage component which is disposed adjacent to the nobel metal catalyst. In the stoichiometric or fuel-rich (i.e., oxygen-lean) atmospheres, the stored $NO_2$ is released, and simultaneously urged to react with HC and CO present in exhaust gases by the action of the noble metal catalyst ingredient which is disposed adjacent to the $NO_x$ storage component. Hence, the catalyst is improved in terms of $NO_x$ purifying performance.

24 Claims, 1 Drawing Sheet

CATALYST FOR PURIFYING EXHAUST GASES

This is a Continuation of application Ser. No. 08/390,785 filed Feb. 17, 1995, now abandoned.

BACKGROUND OF THE INVENTION

1. Field of the Invention

The present invention relates to a catalyst for purifying exhaust gases. More particularly, it relates to the catalyst which can efficiently purify nitrogen oxides ($NO_x$) in the exhaust gases whose oxygen concentrations are at the stoichiometric point or more than required for oxidizing carbon monoxide (CO) and hydrocarbons (HC) therein.

2. Description of Related Art

As catalysts for purifying automotive exhaust gases, there have been employed 3-way catalysts so far which oxidize CO and HC and reduce $NO_x$ to purify the exhaust gases. For example, the 3-way catalysts have been known widely which comprise a heat resistant honeycomb-shaped monolithic support formed of cordierite and having cellular walls, a porous layer formed of gamma-alumina and disposed on the cellular walls, and a noble metal catalyst ingredient selected from the group consisting of Pt, Pd and Rh and loaded on the porous layer.

The purifying performance of the 3-way catalysts for purifying exhaust gases depends greatly on the air-fuel ratio A/F of automotive engine. For instance, when the air-fuel weight ratio is larger than 14.6, i.e., when the fuel concentration is low (or on the fuel-lean side), the oxygen concentration is high in exhaust gases (hereinafter simply referred to as "fuel-lean atmospheres"). Accordingly, the oxidation reactions purifying CO and HC are active, but the reduction reactions purifying $NO_x$ are inactive. On the other hand, when the air-fuel ratio is smaller than 14.6, i.e., when the fuel concentration is high (or on the fuel-rich side), the oxygen concentration is low in exhaust gases (hereinafter simply referred to as "fuel-rich atmospheres"). Accordingly, the oxidation reactions are inactive, but the reduction reactions are active.

Moreover, when driving automobiles, especially when driving automobiles in urban areas, the automobiles are accelerated and decelerated frequently. Consequently, the air-fuel ratio varies frequently in the range of from the values adjacent to the stoichiometric point (or the theoretical air-fuel ratio: 14.6) to the fuel-rich side. In order to satisfy the low fuel consumption requirement during the driving conditions such as in the above-described urban areas, it is necessary to operate the automobiles on the fuel-lean side where the air-fuel mixture containing oxygen as excessive as possible is supplied to the engines. Hence, it has been desired to develop a catalyst which is capable of adequately purifying $NO_x$ even in exhaust gases of fuel-lean atmospheres.

In view of the aforementioned circumstances, the applicants et al. of the present invention proposed a novel catalyst in Japanese Unexamined Patent Publication (KOKAI) No. 5-317,652. In this catalyst, an alkaline-earth metal and Pt are loaded on a support including porous substance.

In accordance with the novel catalyst, in exhaust gases of fuel-lean atmospheres, $NO_x$, which includes NO in an amount of about 90% by volume and the balance of $NO_2$ etc., is stored in the alkaline-earth metal elements. In particular, the NO is oxidized to $NO_2$ by the Pt. The resulting $NO_2$ is reacted with the alkaline-earth metal elements to produce alkaline-earth metal nitrates (e.g., barium nitrate, $Ba(NO_3)_2$), thereby being stored in the alkaline-earth metal elements. When the air-fuel mixture varies from the stoichiometric point to the fuel-rich atmospheres, the stored $NO_2$ is released from the alkaline-earth metal elements, and it is reacted with HC, CO and the like, included in exhaust gases, by the action of the Pt. Thus, $NO_x$ is reduced and purified to $N_2$. As a result, the catalyst exhibits superb $NO_x$ purifying performance in fuel-lean atmospheres.

In other words, NO components are present in a large amount in $NO_x$ included in exhaust gases, but they cannot be stored directly on the $NO_x$ storage component (e.g., an alkaline-earth metal, etc.). That is, after NO components are oxidized to $NO_2$ by the oxidation action of the noble metal catalyst ingredient (e.g., Pt, etc.), they are stored in the $NO_x$ storage component at last. Namely, the $NO_x$ storage component cannot store $NO_x$ therein by itself, and it can maximumly exhibit its $NO_x$ storing capability when it is disposed adjacent to the noble metal catalyst ingredient, such as Pt and the like.

When producing the above-described novel exhaust-gases-purifying catalyst, the noble metal catalyst ingredient, for example Pt, is loaded as follows: a honeycomb-shaped monolithic support is prepared which has cellular walls, and a porous layer formed of alumina or the like and disposed on the cellular walls. Then, the support is immersed into a platinum dinitrodiammine aqueous solution of low concentration. After a predetermined time has passed, the support is taken out of the aqueous solution, dried and calcinated.

Accordingly, the platinum dinitrodiammine aqueous solution is impregnated into the porous layer from the outer portion to the inner portion in this order, and at the same time it is impregnated into pores of the porous substance (e.g., alumina) in the outer and inner portions. The terms, "outer portion" and "inner portion," herein have the following meaning: when the porous layer coated on cellular walls of the support is viewed cross-sectionally, the "outer portion" denotes a part of the porous layer which contacts with exhaust gases flowing through the support, and the "inner portion" denotes a part of the porous layer which contacts with the support.

In the aforementioned Pt loading, the platinum dinitrodiammine aqueous solution of low concentration is prepared in a volume equal to or more than a water storing capability exhibited by the support. When the porous layer is constituted by alumina, the term, "water storing capability," herein means a total amount of the aqueous solution which can be filled in pores of the alumina itself. When Pt is loaded on the support in an amount of about 1 gram with respect to 1 liter of the support, and when a water storing capability of the support is about 0.2 liters with respect to 1 liter of the support, the aqueous solution contains Pt in an amount of about 5 grams with respect to 1 liter of the aqueous solution.

Thus, in the Pt loading described above, the Pt content is low and the aqueous solution is prepared in a large volume, Pt is included in low concentration in the aqueous solution, and it is very likely to be stored in the porous support formed of alumina, etc. Accordingly, a major portion of Pt is instantaneously stored and loaded on the outer portion, and substantially no Pt is present to be loaded on the inner portion. As a result, Pt is loaded in a distribution in which Pt is loaded more on the outer portion but less on the inner portion.

On the other hand, the alkaline-earth metal, for example Ba, is loaded as follows: the support with Pt loaded is immersed into an alkaline-earth metal compound (e.g., barium acetate) aqueous solution of high concentration. Then, the support is dried and calcinated while it holds the aqueous solution fully therein (e.g., in all of the pores of the alumina itself). In this type of alkaline-earth metal loading, the alkaline-earth metal is loaded virtually uniformly from the outer portion to the inner portion of the porous layer.

In the alkaline-earth metal loading, the barium acetate aqueous solution of high concentration is prepared in a volume substantially equal to the water storing capability exhibited by the support. When Ba is loaded on the support in an amount of about 0.2 moles with respect to 1 liter of the support, and when the support exhibited the same water storing capability as above, the aqueous solution contains barium being in the metallic form in an amount of about 137 grams (1 mole) with respect to 1 liter of the aqueous solution.

The Pt loading and the alkaline-earth metal loading are thus different from each other. The difference results in that Pt is loaded in an amount decreasing from the outer portion to the inner portion in the porous layer, and that the alkaline-earth metal is loaded uniformly from the outer portion to the inner portion in the porous layer.

All in all, in the outer portion of the porous layer, Pt and the alkaline-earth metal meet each other with high probability. On the contrary, in the inner portion of the porous layer, Pt and the alkaline-earth metal meet each other with low probability, and accordingly Pt is not present adjacent to the alkaline-earth element. As a result, the alkaline-earth metal loaded on the inner portion might not be able to exhibit its function at all. Namely, it might not store $NO_x$ thereon in exhaust gases of fuel-lean atmospheres. Specifically, since it might not store $NO_x$ thereon and it might not release $NO_x$ either, no reductive purifying action might arise. Thus, the novel exhaust-gases-purifying catalyst described above might not be improved in term of $NO_x$ purifying performance.

In order to solve the aforementioned problems, it is possible to increase the loading amount of Pt or to concentrate the concentration of Pt by reducing the volume of the water of the platinum dinitrodiammine aqueous solution. However, these countermeasures cannot be taken because of the following reasons. Namely, the increment in the Pt loading amount pushes up production cost inevitably. Since the volume reduction in the water does not result in the Pt content variation, and since Pt is likely to store in the porous layer invariably, Pt is still loaded on the outer portion of the porous layer in a large amount.

SUMMARY OF THE INVENTION

The present invention has been developed in view of the aforementioned circumstances. It is therefore an object of the present invention to provide a catalyst in which an $NO_x$ storage component (e.g., an alkaline-earth metal, etc.) is loaded uniformly on a porous layer and a noble metal catalyst ingredient (e.g., Pt, etc.) is loaded so as to be disposed adjacent to the uniformly loaded $NO_x$ storage component, thereby fully utilizing the $NO_x$ storing and releasing capabilities of the $NO_x$ storage component which have not been exhibited adequately, and thereby eventually upgrading $NO_x$ purifying performance.

In accordance with the present invention, a catalyst can solve the aforementioned problems. A catalyst for purifying exhaust gases according to the present invention comprises:

a heat resistant support;

a porous layer coated on the heat resistant support;

a noble metal catalyst ingredient loaded on the porous layer; and an $NO_x$ storage component including at least one member selected from the group consisting of alkaline-earth metals, rare-earth elements and alkali metals, and loaded on the porous layer;

the noble metal catalyst ingredient and the $NO_x$ storage component disposed adjacent to each other, and dispersed uniformly in the porous layer.

In the present catalyst, the noble metal catalyst ingredient and the $NO_x$ storage component are loaded so that they are disposed adjacent to each other, and that they are dispersed uniformly from the outer portion to the inner portion in the porous layer.

Hence, when atmospheres of exhaust gases are turned into fuel-lean atmospheres, NO, occupying a major portion of $NO_x$ in exhaust gases, is first oxidized to $NO_2$ by the noble metal catalyst ingredient at the outer portion of the porous layer, and simultaneously it is stored in the $NO_x$ storage component which is disposed adjacent to the noble metal catalyst ingredient.

Further, NO also goes into the inner portion of the porous layer, and thereby it is oxidized to $NO_2$ by the noble metal catalyst ingredient loaded similarly on the inner portion. At the same time, $NO_2$ is stored in the $NO_x$ storage component which is disposed adjacent to the noble metal catalyst ingredient.

Furthermore, when atmospheres of exhaust gases are varied from the stoichiometric point to fuel-rich atmospheres, the stored $NO_2$ is released from the $NO_x$ storage component. Then, the released $NO_2$ is reacted with HC and CO, which are present in exhaust gases, by the action of the noble metal catalyst ingredient which is disposed adjacent to the $NO_x$ storage component, and thereby it is reduced and purified to $N_2$.

In this way, it is possible to fully effect the $NO_x$ storing and releasing capabilities of the $NO_x$ storage component which is loaded not only on the outer portion of the porous layer but also on the inner portion thereof. Accordingly, the present catalyst can exhibit high $NO_x$ conversion.

In addition, it is preferable to uniformly load at least one of Pt and Pd from the outer portion to the inner portion in the porous layer, and to further load Rh on the outer portion in a large amount. This optional arrangement is developed based on the following reasons: Rh is superior to Pt or Pd in terms of reductive purifying performance. When atmospheres of exhaust gases are varied from the stoichiometric point to fuel-rich atmospheres, the reduction reactions between $NO_x$ (present in exhaust gases) and HC or CO (present in exhaust gases), and the reduction reactions between $NO_2$ (released from the $NO_x$ storage component) between HC or CO (present in exhaust gases) can be facilitated by loading Rh on the outer portion of the porous layer where Rh contacts with $NO_x$, HC and CO with high probability.

As for the heat resistant support, it is possible to select at least one member from the group consisting of a monolithic support formed of cordierite and a metallic support.

As for the porous layer, it is possible to select at least one member from the group consisting of alumina, zeolite, zirconia, silica-alumina, silica and the combinations thereof.

As for the noble metal catalyst ingredient, it is possible to select at least one element from the group consisting of Pt, Rh and Pd.

As for the alkaline-earth metals constituting the $NO_x$ storage component, it is possible to select at least one alkaline-earth metal from the group consisting of barium (Ba), strontium (Sr) and calcium (Ca).

As for the rare-earth elements constituting the $NO_x$ storage component, it is possible to select at least one rare-earth element from the group consisting of lanthanum (La), yttrium (Y) and cerium (Ce). Unless otherwise specified, the term, "rare-earth elements," herein includes not only the chemical elements with atomic numbers 58 through 71, but also $_{39}$Y and $_{57}$La.

As for the alkali metals constituting the $NO_x$ storage component, it is possible to select at least one alkali metal from the group consisting of lithium (Li), potassium (K) and sodium (Na).

As for the loading amount of the noble metal catalyst ingredient, it is preferred to load the noble metal catalyst ingredient in an amount of from 0.1 to 10.0 grams, further preferably from 0.5 to 3.0 grams, with respect to 1 liter of the heat resistant support. When at least two of the noble metal catalyst ingredients are loaded combinedly, they are preferably loaded combinedly in a combined amount of from 0.1 to 10.0 grams, further preferably from 0.5 to 3.0 grams, with respect to 1 liter of the heat resistant support. When the loading amount is less than 0.1 gram with respect to 1 liter of the heat resistant support, the resulting catalysts might not exhibit satisfactory catalytic activity. When the loading amount is more than 10.0 grams with respect to 1 liter of the heat resistant support, the grain growth of noble metal catalyst ingredients is facilitated by increasing the loading amount of them, and such loading does not contribute to the improvement of the catalytic activity in the resulting catalysts but pushes up the production cost of the resulting catalysts. In particular, when the loading amount falls in a range of from 0.5 to 3.0 grams with respect to 1 liter of the heat resistant support, such loading amount is preferable in view of the catalytic activity in the present catalyst and the production cost of the present catalyst.

As for the loading amount of the $NO_x$ storage component, it is preferred to load the $NO_x$ storage component in an amount of from 0.05 to 10.0 moles, further preferably from 0.05 to 1.0 mole, with respect to 1 liter of the heat resistant support. When at least two of the $NO_x$ storage components are loaded combinedly, they are preferably loaded combinedly in a combined amount of from 0.05 to 10.0 moles, further preferably from 0.05 to 1.0 mole, with respect to 1 liter of the heat resistant support. When the loading amount is less than 0.05 moles with respect to 1 liter of the heat resistant support, the resulting catalysts might not exhibit sufficient $NO_x$ purifying performance. When the loading amount is more than 10.0 moles with respect to 1 liter of the heat resistant support, such a loading amount might decrease the surface area of the porous layer.

Thus, in accordance with the present invention, when the exhaust gases are of fuel-lean atmospheres, the reductive purifying capability of the noble metal catalyst ingredient loaded on the inner portion of the porous layer and the $NO_x$ storing capability of the $NO_x$ storage component loaded thereon are added respectively to the reductive purifying capability of the noble metal catalyst ingredient loaded on the outer portion and the $NO_x$ storing capability of the $NO_x$ storage component loaded thereon. Likewise, when the atmospheres of the exhaust gases are varied from the stoichiometric point to fuel-rich atmospheres, the reductive purifying capability of the noble metal catalyst ingredient loaded on the inner portion and the $NO_x$ releasing capability of the $NO_x$ storage component loaded thereon are added respectively to the reductive purifying capability of the noble metal catalyst ingredient loaded on the outer portion and the $NO_x$ releasing capability of the $NO_x$ storage component loaded thereon. Therefore, the present exhaust-gases-purifying catalyst can be improved in terms of $NO_x$ conversion.

In addition, when Rh is loaded on the outer portion of the porous layer, the present exhaust-gases-purifying catalyst can be further enhanced in terms of $NO_x$ conversion.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

First of all, an alumina powder having an average particle diameter of 10 micrometers was added to a platinum dinitrodiammine aqueous solution to mix therewith. After stirring the mixture, the alumina powder was dried and calcinated, thereby preparing an alumina powder with Pt loaded thereon.

Moreover, the resulting alumina powder with Pt loaded was added to a barium acetate aqueous solution to mix therewith. After stirring the mixture, the alumina powder was dried and calcinated, thereby preparing an alumina powder with Pt and Ba loaded thereon.

Then, 500 grams of the alumina powder with Pt and Ba loaded, 150 c.c. of water, and 350 grams of alumina sol containing alumina in an amount of 10% by weight were stirred to mix, thereby preparing a slurry for coating.

Finally, a plurality of honeycomb-shaped monolithic supports having a volume of 1.3 liters and formed of cordierite were immersed into the slurry. After taking each of the supports out of the slurry, each of them was blown to blow away the slurry in excess. Thereafter, each of the supports was dried at 80° C. for 1 hour, and each of them was calcinated at 500° C. for 1 hour, thereby producing exhaust-gases-purifying catalysts No. 1 of the First Preferred Embodiment. The process for loading Pt and Ba according to the First Preferred Embodiment will be hereinafter referred to as the loading process "A."

Figure 1:
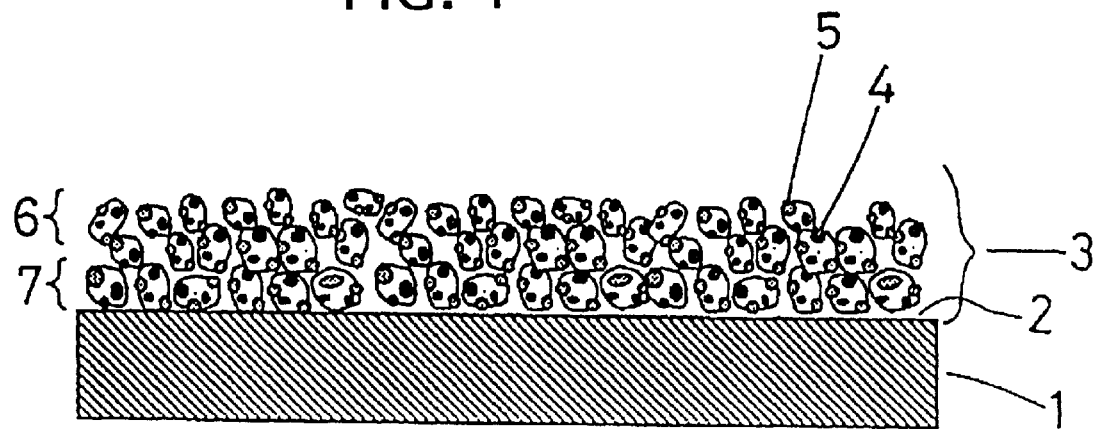
FIG. 1 is an enlarged cross-sectional view on a major portion of an exhaust-gases-purifying catalyst of a preferred embodiment according to the present invention.

In FIG. 1, there is illustrated an enlarged cross-sectional view on a major portion of exhaust-gases-purifying catalyst No. 1 of the First Preferred Embodiment. This exhaust-gases-purifying catalyst No. 1 comprises a support 1 having a cellular wall 2, a porous layer 3 coated on the surface of the cellular wall 2, and Pt and Ba designated, respectively, at 4 and 5. The Pt (designated at 4) and Ba (designated at 5) are loaded on the porous layer 3 and dispersed uniformly therein.

In exhaust-gases-purifying catalyst No. 1, the porous layer 3 was formed in an amount of 100 grams with respect to 1 liter of the support 1. As summarized in Table 1 below, in exhaust-gases-purifying catalyst No. 1, Pt was loaded in an amount of 1.0 gram with respect to 1 liter of the support, and Ba was loaded in an amount of 0.2 moles with respect to 1 liter of the support.

Further, as set forth in Table 1, exhaust-gases-purifying catalysts Nos. 2, 3, 6 and 7 of the First Preferred Embodiment were similarly produced by substituting the $NO_x$ storage components and the noble metal catalyst ingredients for those of exhaust-gases-purifying catalyst No. 1 and by varying their loading amounts.

into the slurry. After taking each of the supports out of the slurry, each of them was blown to blow away the slurry in excess. Thereafter, each of the supports was dried at 80° C. for 1 hour, and each of them was calcinated at 500° C. for 1 hour, thereby forming a porous layer thereon.

Finally, predetermined amounts of platinum dinitrodiammine and potassium nitrate were dissolved into distilled water which were prepared in a volume substantially equal to the water adsorption amount exhibited by the support, thereby preparing a mixed solution for soaking. Each of the

TABLE 1

| | | Noble Metal Catalyst Ingredient Loading Amount (gram/liter) | | | NOx Storage Component Loading Amount (mole/liter) | | | | | Loading Process | Initial Conversion (%) | | | Conversion After Durability Test (%) | | |
|---|---|---|---|---|---|---|---|---|---|---|---|---|---|---|---|---|
| | | Pt | Pd | Rh | Ba | La | Li | K | Na | | NOx | HC | CO | NOx | HC | CO |
| 1st Pref. Embodiment | No. 1 | 1.0 | — | — | 0.2 | — | — | — | — | "A" | 92 | 97 | 100 | 62 | 96 | 99 |
| " | No. 2 | 1.0 | — | — | — | 0.2 | — | — | — | "A" | 91 | 98 | 100 | 60 | 98 | 99 |
| " | No. 3 | 1.0 | — | — | — | — | 0.2 | — | — | "A" | 90 | 95 | 100 | 60 | 96 | 99 |
| 2nd Pref. Embodiment | No. 4 | 1.0 | — | — | — | — | — | 0.2 | — | "B" | 92 | 95 | 100 | 62 | 92 | 100 |
| " | No. 5 | 1.0 | — | — | — | — | — | — | 0.2 | "B" | 92 | 95 | 100 | 61 | 92 | 99 |
| 1st Pref. Embodiment | No. 6 | 1.0 | — | — | 0.3 | — | 0.1 | — | — | "A" | 90 | 96 | 100 | 65 | 95 | 99 |
| " | No. 7 | — | 2.0 | — | 0.3 | 0.1 | — | — | — | "A" | 92 | 95 | 100 | 66 | 93 | 100 |
| 2nd Pref. Embodiment | No. 8 | — | 2.0 | — | 0.3 | — | — | — | 0.1 | "B" | 91 | 94 | 100 | 65 | 92 | 99 |
| 1st Pref. Embodiment | No. 9 | 1.0 | — | 0.1 | 0.2 | — | — | — | — | "A" | 95 | 99 | 100 | 67 | 97 | 100 |
| " | No. 10 | 1.0 | — | 0.1 | — | 0.2 | — | — | — | "A" | 92 | 99 | 100 | 65 | 99 | 99 |
| " | No. 11 | 1.0 | — | 0.1 | — | — | 0.2 | — | — | "A" | 93 | 97 | 100 | 68 | 95 | 99 |
| " | No. 12 | 1.0 | — | 0.1 | 0.3 | — | 0.1 | — | — | "A" | 96 | 96 | 100 | 70 | 98 | 100 |
| " | No. 13 | — | 2.0 | 0.1 | 0.3 | 0.1 | — | — | — | "A" | 96 | 96 | 100 | 68 | 95 | 99 |
| 3rd Pref. Embodiment | No. 14 | 1.0 | — | — | 0.2 | — | — | — | — | "C" | 92 | 97 | 100 | 62 | 96 | 99 |
| " | No. 15 | — | 2.0 | — | — | 0.2 | — | — | — | "C" | 90 | 99 | 100 | 60 | 94 | 100 |
| " | No. 16 | 1.0 | — | 0.1 | 0.2 | — | — | — | — | "C" | 94 | 97 | 100 | 64 | 96 | 99 |
| " | No. 17 | — | 2.0 | 0.1 | — | 0.2 | — | — | — | "C" | 92 | 99 | 100 | 52 | 95 | 99 |
| 2nd Pref. Embodiment | No. 18 | 1.0 | — | 0.1 | — | — | — | 0.2 | — | "B" | 96 | 97 | 100 | 67 | 96 | 99 |
| " | No. 19 | 1.0 | — | 0.1 | — | — | — | — | 0.2 | "B" | 92 | 96 | 100 | 66 | 94 | 100 |
| " | No. 20 | — | 2.0 | 0.1 | 0.3 | — | — | — | 0.1 | "B" | 91 | 96 | 100 | 60 | 94 | 99 |
| Comparative Example | No. 21 | 1.0 | — | 0.1 | 0.2 | — | — | — | — | "D" | 86 | 96 | 100 | 50 | 96 | 99 |
| " | No. 22 | 1.0 | — | — | 0.3 | — | 0.1 | — | — | "D" | 83 | 96 | 100 | 43 | 96 | 99 |
| " | No. 23 | — | 2.0 | 0.1 | 0.3 | — | — | — | 0.1 | "D" | 86 | 96 | 100 | 45 | 95 | 99 |
| " | No. 24 | 1.0 | — | 0.1 | 0.2 | — | — | — | — | "A" | 88 | 96 | 100 | 57 | 96 | 99 |

Furthermore, exhaust-gases-purifying catalysts Nos. 9 through 13 of the First Preferred Embodiment were produced in the following manner. That is, 5 exhaust-gases-purifying catalysts of the First Preferred Embodiment (e.g., exhaust-gases-purifying catalysts Nos. 1, 2, 3, 6 and 7) were immersed into a rhodium nitrate aqueous solution for 1 hour. After taking each of the catalysts out of the solution, each of them was blown to blow away the solution in excess. Thereafter, each of the catalysts was dried at 80° C. for 1 hour, and each of them was calcinated at 250° C. for 1 hour, thereby producing exhaust-gases-purifying catalysts Nos. 9 through 13.

Figure 2:
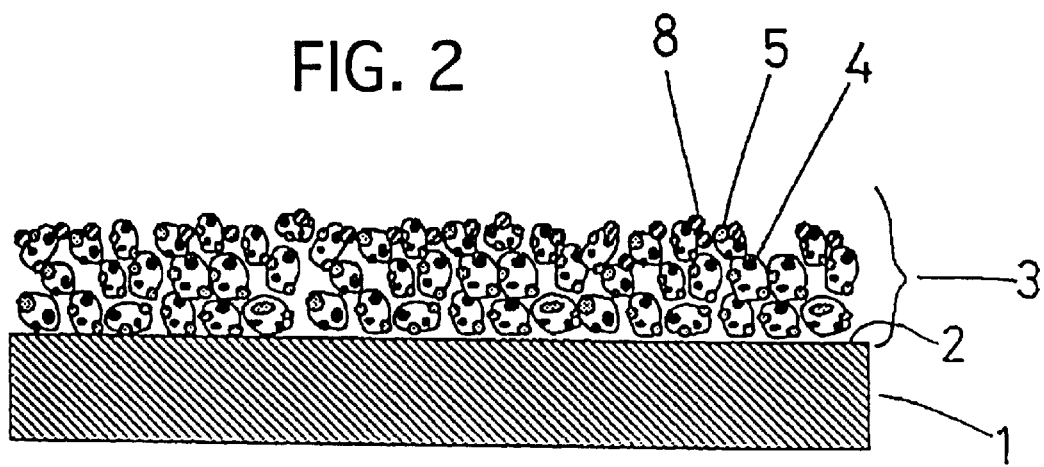
FIG. 2 is an enlarged cross-sectional view on a major portion of an exhaust-gases-purifying catalyst of another preferred embodiment according to the present invention.

Thus, as illustrated in FIG. 2, Rh (designated at 8) is stored and loaded on an outer portion 6 of the porous layer 3 in exhaust-gases-purifying catalysts Nos. 9 through 13 of the First Preferred Embodiment. FIG. 2 schematically illustrates an enlarged cross-sectional view on a major portion of exhaust-gases-purifying catalysts Nos. 9 through 13.

Second Preferred Embodiment

First of all, 500 grams of an alumina powder, 150 c.c. of water, and 350 grams of alumina sol containing alumina in an amount of 10% by weight were stirred to mix, thereby preparing a slurry for coating.

Then, a plurality of honeycomb-shaped supports having a volume of 1.3 liters and formed of cordierite were immersed supports having the porous layer was soaked with the mixed solution. Thereafter, each of the supports was dried at 80° C. for 1 hour, and each of them was calcinated at 250° C. for 1 hour, thereby producing exhaust-gases-purifying catalysts No. 4 of the Second Preferred Embodiment.

In this loading process, the dinitrodiammine and the potassium nitrate were stored into the pores of the porous layer by using the mixed solution of high concentration. Accordingly, the dinitrodiammine and the potassium nitrate could be dispersed substantially uniformly in the porous layer. The process for loading Pt and K according to the Second Preferred Embodiment will be hereinafter referred to as the loading process "B."

Further, as set forth in Table 1, exhaust-gases-purifying catalysts Nos. 5 and 8 of the Second Preferred Embodiment were similarly produced by substituting the $NO_x$ storage components and the noble metal catalyst ingredients for those of exhaust-gases-purifying catalyst No. 4 and by varying their loading amounts.

Furthermore, exhaust-gases-purifying catalysts Nos. 18 through 20 of the Second Preferred Embodiment were produced in the following manner. That is, 3 exhaust-gases-purifying catalysts of the Second Preferred Embodiment (e.g., exhaust-gases-purifying catalysts Nos. 4, 5 and 8) were immersed into a rhodium nitrate aqueous solution for 1 hour. After taking each of the catalysts out of the solution, each of them was blown to blow away the solution in excess. Thereafter, each of the catalysts was dried at 80° C. for 1 hour, and each of them was calcinated at 250° C. for 1 hour, thereby storing and loading Rh on outer portions of the porous layer. Three exhaust-gases-purifying catalysts, i.e., Nos. 18 through 20, were thus produced.

Third Preferred Embodiment

First of all, an alumina powder having an average particle diameter of 10 micrometers was added to a platinum dinitrodiammine aqueous solution to mix therewith. After stirring the mixture, the alumina powder was dried and calcinated, thereby preparing an alumina powder with Pt loaded thereon.

Moreover, 500 grams of the resulting alumina powder with Pt loaded, 150 c.c. of water, and 350 grams of alumina sol containing alumina in an amount of 10% by weight were stirred to mix, thereby preparing a slurry for coating.

Then, a plurality of honeycomb-shaped monolithic supports having a volume of 1.3 liters and formed of cordierite were immersed into the slurry. After taking each of the supports out of the slurry, each of them was blown to blow away the slurry in excess. Thereafter, each of the supports was dried at 80° C. for 1 hour, and each of them was calcinated at 500° C. for 1 hour, thereby forming a porous support on which Pt was loaded uniformly.

Finally, a barium acetate aqueous solution was prepared. The solution was prepared in a volume which was substantially equal to the water adsorption amount exhibited by the support, and it included Ba in a predetermined amount. Each of the supports having the porous layer was soaked with the solution. Thereafter, each of the supports was dried at 80° C. for 1 hour, and each of them was calcinated at 500° C. for 1 hour, thereby producing exhaust-gases-purifying catalysts No. 14 of the Third Preferred Embodiment. The process for loading Pt and Ba according to the Third Preferred Embodiment will be hereinafter referred to as the loading process "C."

Likewise, as set forth in Table 1, exhaust-gases-purifying catalysts Nos. 15 through 17 of the Third Preferred Embodiment were similarly produced by substituting the $NO_x$ storage components and the noble metal catalyst ingredients for those of exhaust-gases-purifying catalyst No. 14 and by varying their loading amounts.

Comparative Example

First of all, 500 grams of an alumina powder, 150 c.c. of water, and 350 grams of alumina sol containing alumina in an amount of 10% by weight were stirred to mix, thereby preparing a slurry for coating.

Then, a plurality of honeycomb-shaped supports having a volume of 1.3 liters and formed of cordierite were immersed into the slurry. After taking each of the supports out of the slurry, each of them was blown to blow away the slurry in excess. Thereafter, each of the supports was dried at 80° C. for 1 hour, and each of them was calcinated at 500° C. for 1 hour, thereby forming a porous layer thereon.

Then, each of the supports having the porous layer was immersed into a 1.5 liter mixed solution containing platinum dinitrodiammine and rhodium nitrate for 1 hour. After taking each of the supports out of the mixed solution, each of them was blown to blow away the mixed solution in excess. Thereafter, each of the supports was dried at 80° C. for 1 hour, and each of them was calcinated at 500° C. for 1 hour, thereby loading Pt and Rh thereon.

Finally, each of the supports with Pt and Rh loaded thereon was soaked with a barium acetate aqueous solution in the same manner as the Third Preferred Embodiment. Thereafter, each of the supports was dried at 80° C. for 1 hour, and each of them was calcinated at 500° C. for 1 hour, thereby producing exhaust-gases-purifying catalysts No. 21 of Comparative Example. The process for loading Pt, Rh and Ba according to Comparative Example will be hereinafter referred to as the loading process "D."

Likewise, as set forth in Table 1, exhaust-gases-purifying catalysts Nos. 22 and 23 of Comparative Example were similarly produced by substituting the $NO_x$ storage components and the noble metal catalyst ingredients for those of exhaust-gases-purifying catalyst No. 21 and by varying their loading amounts.

In addition, except that rhodium nitrate was first loaded on an alumina powder by using a mixed aqueous solution containing platinum dinitrodiammine and rhodium nitrate, exhaust-gases-purifying catalysts No. 24 of Comparative Example were prepared in the same manner as exhaust-gases-purifying catalysts No. 9 of the First Preferred Embodiment.

Examination and Evaluation

Each of catalysts Nos. 1 through 20 of the First through Third Preferred Embodiments as well as catalysts Nos. 21 through 24 of Comparative Example was subjected to the EPMA (i.e., electron probe microanalysis) in order to investigate how the noble metal catalyst ingredients and the $NO_x$ storage components were distributed in the porous layer. As a result, in catalysts Nos. 1 through 20 of the First through Third Preferred Embodiments, the noble metal catalyst ingredients (e.g., Pt and Pd) and the $NO_x$ storage components were distributed and dispersed uniformly in the porous layers, and Rh was largely distributed in the outer portions. Thus, in catalysts Nos. 1 through 20 of the First through Third Preferred Embodiments, the noble metal catalyst ingredients and the $NO_x$ storage components were loaded in either of the states illustrated in FIGS. 1 and 2. On the other hand, in catalysts Nos. 21 through 24 of Comparative Example, although the $NO_x$ storage components were distributed uniformly in the porous layers, all of the noble metal catalyst ingredients (e.g., Pt, Pd and Rh) were largely distributed in the outer portions to show deviated distributions.

Moreover, each of catalysts Nos. 1 through 20 of the First through Third Preferred Embodiments as well as catalysts Nos. 21 through 24 of Comparative Example was disposed in an exhaust line of an actual vehicle equipped with a lean burn engine. The lean burn engine had a displacement of 1.6 liters. The vehicle was driven in the urban area running mode, thereby examining the catalysts for the conversion of HC, CO and $NO_x$. The results of the examination are summarized in the columns designated at "Initial Conversion" in Table 1.

After the aforementioned examination, each of catalysts Nos. 1 through 20 of the First through Third Preferred Embodiments as well as catalysts Nos. 21 through 24 of Comparative Example was subjected to a bench test on durability which utilized the same type of engine as above. Namely, each of them was disposed in an exhaust line of the engine, and then the engine was run at an air-fuel ratio A/F of 18 for 50 hours while adjusting the temperature of the exhaust gas introduced into them at 650° C. After this bench test was over, each of them was again disposed in the exhaust line of the actual vehicle. The vehicle was driven in the same manner as described above, thereby examining the catalysts for the conversion of HC, CO and $NO_x$. The results of the examination are summarized in the columns designated at "Conversion after Durability Test" in Table 1.

As can be appreciated from Table 1, catalysts Nos. 1 through 20 of the First through Third Preferred Embodiments were improved over catalysts Nos. 21 through 24 of Comparative Example in terms of the $NO_x$ conversions. Thus, it is apparent that, by loading a noble metal catalyst ingredient and an $NO_x$ storage component so as to uniformly distribute in a porous layer, an exhaust-gases-purifying catalyst can be upgraded in terms of the initial $NO_x$ conversion and the $NO_x$ conversion after the durability test.

Moreover, it is obvious that, by loading Rh on an outer portion of a porous layer, an exhaust-gases-purifying catalyst can be further enhanced in terms of the $NO_x$ conversions.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst for purifying exhaust gases in fuel-lean atmospheres in which oxygen concentrations of said exhaust gases are at or above the stoichiometric point required for oxidizing the components to be oxidized therein, comprising:
    a heat resistant support;
    a porous layer coated on said heat resistant support;
    a noble metal catalyst ingredient loaded on said porous layer; and
    an $NO_x$ storage component including at least one member selected from the group consisting of alkaline-earth metals, rare-earth elements and alkali metals, and loaded on said porous layer in an amount of 0.05 to 10 mol/liter of support;
    said noble metal catalyst ingredient and said $NO_x$ storage component disposed adjacent to each other, and dispersed uniformly throughout said porous layer.

2. The catalyst according to claim 1, wherein said heat resistant support includes at least one member selected from the group consisting of a monolithic support formed of cordierite and a metallic support.

3. The catalyst according to claim 1, wherein said porous layer includes at least one member selected from the group consisting of alumina, zeolite, zirconia, silica-alumina, silica and the combinations thereof.

4. The catalyst according to claim 1, wherein said $NO_x$ storage component is at least one alkaline-earth metal selected from the group consisting of barium (Ba), strontium (Sr) and calcium (Ca).

5. The catalyst according to claim 1, wherein said $NO_x$ storage component is at least one rare-earth element selected from the group consisting of lanthanum (La) and yttrium (Y).

6. The catalyst according to claim 1, wherein said $NO_x$ storage component is at least one alkali metal selected from the group consisting of lithium (Li), potassium (K) and sodium (Na).

7. The catalyst according to claim 1, wherein said $NO_x$ storage component is loaded in an amount which is effective to store nitrogen oxide ($NO_x$) in exhaust gases whose oxygen concentrations are at the stoichiometric point or more than required for oxidizing carbon monoxide (CO) and hydrocarbons (HC).

8. The catalyst according to claim 1, wherein said $NO_x$ storage component is loaded in amount of from 0.05 to 1.0 mole with respect to 1 liter of said heat resistant support.

9. The catalyst according to claim 1, wherein at least two of said $NO_x$ storage components are loaded combinedly in a combined amount which is effective to store $NO_x$ in exhaust gases whose oxygen concentrations are at the stoichiometric point or more than required for oxidizing CO and HC.

10. The catalyst according to claim 9, wherein at least two of said $NO_x$ storage components are loaded combinedly in a combined amount of from 0.05 to 1.0 mole with respect to 1 liter of said heat resistant support.

11. The catalyst according to claim 1, wherein said noble metal catalyst ingredient is at least one element selected from the group consisting of Pt, Rh and Pd.

12. The catalyst according to claim 1, wherein said noble metal catalyst ingredient is loaded in an amount which is effective to purify $NO_x$, CO and HC in exhaust gases whose oxygen concentrations are at the stoichiometric point or more than required for oxidizing CO and HC.

13. The catalyst according to claim 12, wherein said noble metal catalyst ingredient is loaded in an amount of from 0.5 to 3.0 grams with respect to 1 liter of said heat resistant support.

14. The catalyst according to claim 11, wherein at least two of said elements are loaded combinedly in a combined amount which is effective to purify $NO_x$, CO and HC in exhaust gases whose oxygen concentrations are at the stoichiometric point or more than required for oxidizing CO and HC.

15. The catalyst according to claim 14, wherein at least two of said elements are loaded combinedly in a combined amount of from 0.5 to 3.0 grams with respect to 1 liter of said heat resistant support.

16. The catalyst according to claim 1, wherein said porous layer has an inner portion contacting with said heat resistant support and an outer portion disposed on the inner portion, at least one of Pt and Pd is dispersed uniformly from the outer portion to the inner portion in said porous layer, and Rh is loaded substantially on the outer portion of said porous layer.

17. The catalyst according to claim 1, wherein, prior to coating said porous layer on said heat resistant support, at least one noble metal catalyst ingredient selected from the group consisting of Pt and Pd is loaded on said porous layer so as to virtually uniformly disperse therein.

18. The catalyst according to claim 1, wherein at least one noble metal catalyst ingredient selected from the group consisting of Pt and Pd is loaded on said porous layer by immersing said heat resistant support with said porous layer coated thereon into an aqueous solution of the noble metal catalyst ingredient which is prepared in a volume equal to or less than a water storing capability exhibited by said heat resistant support with said porous layer coated thereon, and by drying.

19. A process for producing the catalyst for purifying exhaust gases according to claim 1 having a noble metal catalyst ingredient and an $NO_x$ storage component disposed adjacent to each other, and dispersed uniformly throughout a porous layer, comprising:
    loading a member selected from the group consisting of alumina, zeolite, zirconia, silica-alumina, silica and combinations thereof with a noble metal catalyst ingredient to produce a noble metal loaded member;
    loading the member with an $NO_x$ storage component by adding the member to a solution of said $NO_x$ storage component to produce a noble metal catalyst ingredient and $NO_x$ storage component loaded member; and forming a porous layer comprising said member coated on a heat resistant support.

20. A process for producing the catalyst for purifying exhaust gases according to claim 1 having a noble metal catalyst ingredient and an $NO_x$ storage component disposed adjacent to each other, and dispersed uniformly throughout a porous layer, comprising:

loading a honeycombed cellular wall of a substrate with a member selected from the group consisting of alumina, zeolite, zirconia, silica-alumina, silica and combinations thereof to form a porous layer;

forming a mixed solution of a noble metal catalyst ingredient and an $NO_x$ storage component; and soaking said porous layer with said solution to uniformly load said porous layer throughout with said noble metal catalyst ingredient and said $NO_x$ storage component.

21. A process for producing the catalyst for purifying exhaust gases according to claim 1 having a noble metal catalyst ingredient and an $NO_x$ storage component disposed adjacent to each other, and dispersed uniformly throughout a porous layer, comprising:

loading a member selected from the group consisting of alumina, zeolite, zirconia, silica-alumina, silica and combinations thereof with a noble metal catalyst ingredient to produce a noble metal catalyst loaded powder;

uniformly loading a honeycombed cellular wall of a substrate with said noble metal catalyst ingredient loaded powder;

soaking said loaded substrate with a solution of an $NO_x$ storage component to form a layer having noble metal catalyst ingredient and $NO_x$ storage component dispersed uniformly throughout said porous layer.

22. A method of purifying an exhaust gas containing a fuel-lean atmosphere, comprising contacting the catalyst according to claim 1 with an exhaust gas in an atmosphere in which oxygen concentration of said exhaust gas is at the stoichiometric point or more required for oxidizing oxidizable components of said exhaust gas.

23. The catalyst according to claim 1, said rare-earth element being selected from the group consisting of Y, La, Pr, Nd, Pm, Sm, Eu, Gd, Tb, Dy, Ho, Er, Tm, Yb and Lu.

24. A process for purifying an exhaust gas from a lean burn engine comprising carbon monoxide, hydrocarbons and nitrogen oxides by bringing said exhaust gas from a lean burn engine into contact with an exhaust gas purifying catalyst comprising:

a heat resistant support;

a porous layer coated on said heat resistant support;

a noble metal catalyst ingredient loaded on said porous layer; and an $NO_x$ storage component including at least one member selected from the group consisting of alkaline-earth metals and rare-earth elements and loaded on said porous layer;

said noble metal catalyst ingredient and said $NO_x$ storage component being disposed adjacent to each other, and dispersed uniformly throughout said porous layer wherein (1) under a fuel-lean atmosphere in which oxygen concentrations are at or above a stoichiometric point that is required for oxidizing components to be oxidized in said exhaust gas, nitrogen oxides in said exhaust gas are oxidized by said noble metal catalyst ingredient and are stored in said $NO_x$ storage component; (2) an air-fuel ratio of said exhaust gas is temporarily adjusted from fuel-lean to fuel-rich, providing a reduction atmosphere in which oxygen concentrations are less than said stoichiometric point; and (3) under said reduction atmosphere, nitrogen oxides stored in said $NO_x$ storage component are released and chemically reduced by a reaction with hydrocarbons and carbon monoxide in said exhaust gas.

* * * * *